United States Patent
Spotts (10) Patent No.: US 11,697,248 B2
(45) Date of Patent: Jul. 11, 2023

(54) OPTIMIZED PATHING SOLUTION FOR ADDITIVE MANUFACTURING

(71) Applicant: FISHER CONTROLS INTERNATIONAL LLC, Marshalltown, IA (US)

(72) Inventor: Ryan E. Spotts, Altoona, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 610 days.

(21) Appl. No.: 16/587,603

(22) Filed: Sep. 30, 2019

(65) Prior Publication Data

US 2021/0094236 A1    Apr. 1, 2021

(51) Int. Cl.
*B29C 64/393*    (2017.01)
*B33Y 50/02*    (2015.01)
(Continued)

(52) U.S. Cl.
CPC ............ *B29C 64/393* (2017.08); *B22F 10/28* (2021.01); *B22F 10/36* (2021.01); *B22F 10/366* (2021.01); *B22F 12/53* (2021.01); *B29C 64/209* (2017.08); *B29C 64/245* (2017.08); *B29C 64/268* (2017.08); *B22F 10/32* (2021.01); *B22F 12/20* (2021.01); *B22F 12/33* (2021.01); *B22F 12/90* (2021.01); *B33Y 10/00* (2014.12); *B33Y 30/00* (2014.12); *B33Y 40/00* (2014.12); *B33Y 50/02* (2014.12)

(58) Field of Classification Search
CPC .... B22F 10/366; B22F 2999/00; B22F 10/30; B22F 12/53; B22F 10/20; B29C 64/209; B29C 64/245; B29C 64/268; B29C 64/393; B33Y 10/00; B33Y 30/00; B33Y 40/00; B33Y 50/02; Y02P 10/25
See application file for complete search history.

(56) References Cited

U.S. PATENT DOCUMENTS

| | | | | |
|---|---|---|---|---|
| 2014/0306380 A1* | 10/2014 | El-Siblani | ............. | B29C 64/135 264/401 |
| 2015/0088295 A1* | 3/2015 | Hellestam | ............. | B33Y 30/00 700/118 |

(Continued)

*Primary Examiner* — Yuhui R Pan
(74) *Attorney, Agent, or Firm* — Marshall, Gerstein & Borun LLP (57) ABSTRACT

An additive manufacturing system (100) includes a build tool (110) configured to deposit a feedstock material and/or deliver consolidation energy promoting consolidation of the feedstock material within an accessible range defining a build space. The system also includes a controller (120) configured to determine a build trajectory through the build space, where the build trajectory includes build points at which the feedstock material and/or the consolidation energy is applied (202), determine respective consolidation times of the feedstock material for one or more of the plurality of the build points (204), determine a deposition rate at which the feedstock material is deposited and/or consolidation energy is delivered to the feedstock material based at least in part on the determined consolidation times of the feedstock material (204), and cause the build tool to build an object in accordance with the determined build trajectory and the determined deposition rate (208).

20 Claims, 3 Drawing Sheets

(51) Int. Cl.
    *B29C 64/209*    (2017.01)
    *B29C 64/268*    (2017.01)
    *B29C 64/245*    (2017.01)
    *B22F 10/28*     (2021.01)
    *B22F 12/53*     (2021.01)
    *B22F 10/36*     (2021.01)
    *B22F 10/366*    (2021.01)
    *B33Y 10/00*     (2015.01)
    *B33Y 30/00*     (2015.01)
    *B33Y 40/00*     (2020.01)
    *B22F 12/20*     (2021.01)
    *B22F 12/33*     (2021.01)
    *B22F 12/90*     (2021.01)
    *B22F 10/32*     (2021.01)

(56) References Cited

U.S. PATENT DOCUMENTS

2016/0263832 A1*   9/2016   Bui ........................ B29C 64/194
2019/0240775 A1*   8/2019   Graham ............. B23K 26/0876
2021/0146613 A1*   5/2021   Hyatt ...................... B22F 10/20

\* cited by examiner

OPTIMIZED PATHING SOLUTION FOR ADDITIVE MANUFACTURING

FIELD OF THE DISCLOSURE

The present disclosure generally relates to additive manufacturing techniques and, more particularly, to improving process efficiency related to depositing material or delivering energy during additive manufacturing.

BACKGROUND

In recent years, additive manufacturing (AM), which includes 3D printing, has gained a wide acceptance in a variety of industrial applications. Manufacturers can use AM to create articles without expensive part-specific tooling required in molding for example. While AM is particularly advantageous in applications where comparatively small numbers of identical parts are created, AM also can improve mass production by accelerating design cycles through rapid prototyping (RP). Using RP, designs can be tested and validated quickly and inexpensively. Additionally, AM enables small-batch production of articles that may need to be tested in the market before mass production, of articles that may benefit from customization, or of articles for niche markets. Still further, it is expected that the disruptive technology of AM, as it matures, may replace a number of other manufacturing methods.

However, one obstacle to a wider adoption of AM is the speed at which articles may be produced for a certain capital investment in production tools and materials. More particularly, some AM systems use consolidation energy to cure feedstock material (e.g., a resin), for example, or to melt feedstock material (e.g., a metal powder). In currently employed AM systems, a significant portion of build or fabrication time is devoted to waiting for feedstock material to consolidate before depositing, curing, or melting proximal feedstock material. The current systems generally employ pre-programmed build trajectories that define the order in which different points or voxels of material are added to an item of manufacture. These systems typically keep the rate of deposition of material or delivery of energy and the travel speed along the pre-determined build trajectory substantially constant during deposition, and system hardware governs the corresponding timing parameters. Thus, processing occurs today at predefined, substantially steady rates.

SUMMARY

To speed up the process of building an article of manufacture (or simply "an object"), an additive manufacturing ("AM") system can determine and, in some cases, dynamically modify one or more control parameters such as the build trajectory corresponding to a sequence of points at which the system applies feedstock material and/or energy, the rate depositing a feedstock material or delivering energy for consolidating feedstock material, or the speed at which a stream of feedstock material or a beam of energy traverses the build trajectory. These parameters can be based at least in part on the consolidation time of feedstock material so that, for example, the AM system selects a build trajectory from among multiple candidates in view of the interval between the respective times at which the AM system deposits feedstock material and/or delivers energy on two proximate points that belong to each of the candidate build trajectories. As discussed in more detail below, the AM system can obtain process parameters that minimize the build time for the article, or at least a portion of the article. Thus, the AM system can account for thermodynamic properties of the material (e.g., a consolidation rate corresponding to a time-based threshold that correlates with the inherent ability of the material to dissipate heat) and thereby facilitate a more efficient process of additively manufactured articles.

One example embodiment of these techniques is an additive manufacturing system that includes a build tool and a controller. The build tool is configured to deposit a feedstock material and/or deliver consolidation energy promoting consolidation of the feedstock material. The build tool operates within an accessible range defining a build space. The controller is configured to determine a build trajectory through the build space, where the build trajectory includes multiple build points at which the feedstock material and/or the consolidation energy is applied. The controller is further configured to determine respective consolidation times of the feedstock material for one or more of the build points, determine a deposition rate at which the feedstock material is deposited and/or consolidation energy is applied and/or delivered to the feedstock material based at least in part on the determined consolidation times of the feedstock material, and cause the build tool to build an object in accordance with the determined build trajectory and the determined deposition rate.

In some cases, the additive manufacturing system also includes one or of the following features. The controller is configured to determine, for at least a portion of the build trajectory, a maximum speed at which the build tool moves a stream of the feedstock material or a beam of energy along the build trajectory, based at least in part on the consolidation times of the feedstock material, and determine the deposition rate of the feedstock material based further on the determined maximum speed. In one such case, the build tool includes a nozzle for outputting the stream of the feedstock material. In another such case, the build tool includes an energy guiding element for outputting a beam of energy. The beam in the latter can be one a laser beam or, more generally, a beam that delivers power to a focal region (e.g., focused UV light from a light emitting diode, an electron beam, etc.). The controller is configured to minimize a build time required for a stream of the feedstock material or a beam of energy to traverse the build trajectory, subject to a constraint related to the consolidation time. To minimize the build time, the controller is configured to determine, for a pair of points separated by at least one intermediate point on the build trajectory, a time interval between respective times when the build tool deposits the feedstock material and/or delivers the consolidation energy at the pair of points. The controller is configured to dynamically vary at least one (i) the deposition rate at which the feedstock material is deposited and/or consolidation energy is delivered along the build trajectory, (ii) a speed at which the build tool moves a stream of the feedstock material or a beam of energy along the build trajectory. The build trajectory includes a sequence of layer-specific trajectories, each layer-specific trajectory may include at least one of a (i) a raster scan trajectory, (ii) a reciprocating raster scan trajectory, or (iii) a spiral trajectory (e.g., inward, outward). To determine the trajectory of the build tool, the controller is configured to determine a metric indicative of expected quality of the object and compute the trajectory to substantially minimize build time while maintaining the metric indicative of the expected quality of the item of manufacture above a threshold value.

Another example embodiment of these techniques is a method of operating an additive manufacturing system in which a build tool is configured to deposit a feedstock material and/or deliver consolidation energy promoting consolidation of the feedstock material within a build space to build an object. The method can be executed by processing hardware and includes determining a build trajectory through the build space, where the build trajectory includes multiple build points at which the feedstock material and/or the consolidation energy is applied, and determining respective consolidation times of the feedstock material for one or more of the plurality of the build points. The method further includes determining, based at least in part on the determined consolidation time of the feedstock material, a deposition rate at which the feedstock material is deposited and/or consolidation energy is delivered to the feedstock material, and causing the build tool to build the object in accordance with the determined build trajectory and the determined deposition rate.

In some cases, the method above also includes one or of the following features. The method includes determining, for at least a portion of the build trajectory, a maximum speed at which the build tool moves a stream of the feedstock material or a beam of energy along the build trajectory, based at least in part on the consolidation times of the feedstock material, and determining the deposition rate of the feedstock material based further on the determined maximum speed. The method includes minimizing a build time required for a stream of the feedstock material or a beam of energy to traverse the build trajectory, subject to a constraint related to the consolidation times. The minimizing of the build time includes determining, for a pair of points separated by at least one intermediate point on the build trajectory, a time interval between respective times when the build tool deposits the feedstock material and/or delivers the consolidation energy at the pair of points. The method includes dynamically varying at least one (i) the deposition rate at which the feedstock material is deposited and/or consolidation energy is delivered along the build trajectory, (ii) a speed at which the build tool moves a stream of the feedstock material or a beam of energy along the build trajectory. Determining the trajectory of the build tool includes determining a metric indicative of expected quality of the object and computing the trajectory to substantially minimize build time while maintaining the metric indicative of the expected quality of the item of manufacture above a threshold value.

Still another example embodiment of these techniques is a non-transitory computer-readable medium storing instructions. When executed by processing hardware, the instructions cause the processing hardware to determine, for a build tool configured to deposit a feedstock material and/or deliver consolidation energy promoting consolidation of the feedstock material, a build trajectory through a build space corresponding to an accessible range of the build tool, the build trajectory including multiple build points at which the feedstock material and/or the consolidation energy is applied. The instructions further cause the processing hardware to determine respective consolidation times of the feedstock material for one or more of the build points, determine a deposition rate at which the feedstock material is deposited and/or consolidation energy is delivered to the feedstock material based at least in part on the determined consolidation times of the feedstock material, and cause the build tool to build an object in accordance with the determined build trajectory and the determined deposition rate.

DETAILED DESCRIPTION

This disclosure relates to configuring an additive manufacturing (AM) system or, equivalently, a 3D printing system to build (print, manufacture, fabricate, or produce) a printed object (a printed item, an article of manufacture) in an efficient manner. The efficiency may refer at least in part to how fast the AM system prints the object, and a numeric metric of efficiency which the AM system seeks to optimize is time. In some implementations, however, the numeric metric of efficiency of manufacturing additionally or alternatively is related to one or more respective metrics of consumption of material, consumption of energy, process robustness (i.e., quality metric dependent on process conditions), probability of defects, and/or any other suitable metrics. The AM system of this disclosure operates so as to optimize the metric of efficiency, in at least some of the implementations.

As discussed below, a controller of an AM system can cause a build tool of the AM system to deposit feedstock material or, in some implementations, deliver consolidation energy to fuse the feedstock material, along a build trajectory made up of a sequence of build points. The controller can select a build trajectory so as to optimize efficiency in view of one or more constraints. For example, the controller can select a build trajectory out of multiple possible build trajectories to print an object in the shortest time while maintaining the quality of the printed object, reflected in one or more quantitative metrics, within a certain range. The controller of the AM system also can determine, for the selected build trajectory, a rate at which the build tool deposits material or delivers energy at each of the build points of the trajectory, and/or how fast the build tool moves the stream of material or the beam of energy from a build point to the next build point along the build trajectory.

Figure 1:
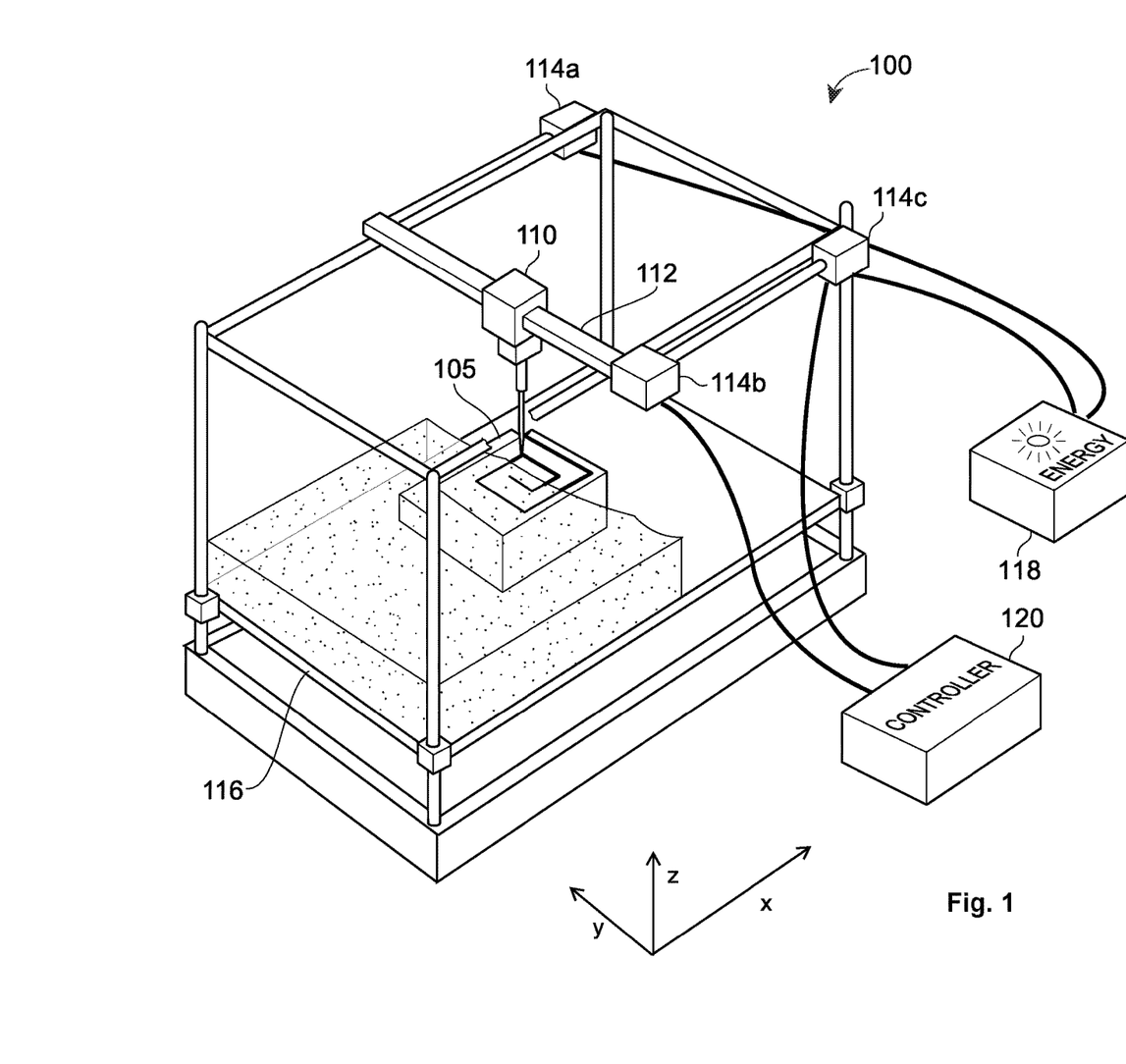
FIG. 1 illustrates an example additive manufacturing (AM) system in which the techniques of this disclosure for efficiently fabricating an article can be implemented.

Referring to FIG. 1, an example AM system 100 is configured to build a printed object 105 from one or more feedstock materials using an AM process or technology. The AM process can be a single-step or a multi-step process. The one or more feedstock materials can include metals, polymers (e.g., plastics), ceramics, and/or composite materials. The AM system 100 can deposit, attach, or consolidate through fusion or adhesion units or quantities of the feedstock materials. The printed object 105 thus includes at least one of the feedstock materials consolidated at the build points. In other words, the printed object 105 includes a union of contiguous build points at which the AM system 100 consolidates the feedstock material, and the build points define the shape and the dimensionality of the printed object 105.

Although FIG. 1 depicts only one printed object 105, in general the AM system 100 can simultaneously build multiple printed objects.

As illustrated in FIG. 1 in a simplified manner, the system 100 includes a build tool 110 capable of depositing the feedstock material and/or delivers consolidation energy promoting consolidation of the feedstock material within an accessible range defining a build space. In operation, the build tool 110 deposits the feedstock material or delivers the consolidation energy along a build trajectory that traverses the build space. The build trajectory can be regarded as defining a path through the build points associated with one or more printed objects. Example trajectories along which the build tool 110 guides a stream of feedstock material or a beam of energy are discussed with reference to FIGS. 3A-3D.

With continued reference to FIG. 1, the build tool 110 in one example implementation includes an energy guiding element 111 (e.g., a beam positioning mechanism) that in turn can include optical and/or opto-mechanical components (e.g., lenses, fiber holders, collimators, scanning mechanisms, etc.), electrostatic lenses, magnetic lenses, acoustic components, gas nozzles, and/or any other suitable components for guiding consolidation energy 107 (e.g., a laser beam, an electron beam, an ultrasonic beam, or a hot gas stream) toward any point within a build space. To avoid clutter, FIG. 1 does not depict certain components the system 100 includes in at least some of the implementations (e.g., beam positioning mirrors, motors for driving the mirrors).

The build space may include a powder bed filled with the feedstock material in powder form. In operation, the top layer (or another absorption layer) of the powder bed absorbs the consolidation energy (e.g., of the laser beam) and melts (or undergoes another suitable chemical and/or physical change), leading to the fusion of the feedstock material. The fused feedstock material consolidates (e.g., upon cooling) to produce a solid form of the printed object 105.

Additionally or alternatively, the build tool 110 may include a nozzle 113 that disperses the feedstock material in liquid, powder, or any other suitable state that can absorb the consolidation energy. The nozzle 113 may be connected to a feeding mechanism configured to feed a filament, a slurry, or another suitably prepared amount of the feedstock material into the nozzle 113. The nozzle 113 may have an adjustable diameter and temperature (e.g., by means of an integrated heater), while the feeding mechanism may have a variable feeding rate. The nozzle 113 may dispense a suitable amount of the feedstock material at each of the build points, where the heated feedstock material may cool and consolidate.

The build tool 110 can be capable of dispensing an inert shielding gas, a cooling liquid or another suitable cooling medium that may accelerate the cooling and the consolidation of the feedstock material. The build tool 110 may dispense material to maintain a favorable chemical environment (e.g., an inert shielding gas, a reagent, or a catalyst). Additionally or alternatively, the build tool 110 may include one or more sensors (e.g., temperature sensors, color sensors, imaging sensors, etc.) that may output a signal indicative of a degree of consolidation of the feedstock material.

The build tool 110 may be in mechanical connection with a build-tool positioning system 112, configured to facilitate or enable access of the build tool 105 to the build space. The positioning system 112 may determine the position of the build tool 110 along the horizontal or X and Y axes, as illustrated in FIG. 1. In some implementations, the build-tool positioning system 112 may be configured to move the build tool along the vertical or Z axis. Additionally or alternatively, the positioning system 112 may enable moving the build tool in other directions and/or along nonlinear paths (e.g. circular, compound trajectories). Furthermore, the positioning system 112 may be configured to change a rotational orientation (e.g., roll, pitch, yaw) of the build tool. Still furthermore, the positioning system 112 may cooperate with a scanning system (whether built into or external to the build tool 110) to direct delivery of consolidation energy to a point within the build space.

The positioning system 112 may be in mechanical connection with one or more actuators, such as the X and Y axis motors 114a-b. The actuators may be AC motors, DC motors, linear motors, servo-motors, artificial muscles, or any other suitable actuators.

The AM system 100 may include a build platform 116, that may, operating by itself or in cooperation with the positioning system 112, change a relative position and/or orientation between the build tool 110 and the printed object 105. For example, the build platform 116 may be configured to move along the Z-axis. The build platform 116 may be in mechanical connection with the motor 114c or another suitable actuator. In some implementations, the build platform 116 may be configured to move and position the printed object 105 along X and/or Y axes instead of or in addition to the Z axis. Additionally or alternatively, the build platform may move along other linear or nonlinear directions and trajectories, and/or change orientation, causing a change in relative position and/or orientation between the build tool 110 and the printed object 105.

At least a portion of the build space may be enclosed in a build-space enclosure. The enclosure, in turn may serve as a reservoir for feedstock material. For example, the enclosure may contain a powder bed of feedstock material (e.g., metal, ceramic, polymer, composite, etc.). The powder bed may absorb the consolidation energy directed and/or delivered by the build tool 110. Upon absorbing the consolidation energy, the feedstock material powder in the powder bed may melt. Subsequently, upon cooling, the melted powder may solidify and consolidate as a part or a segment of the printed object 105.

The AM system may include an energy source 118 which generates the consolidation energy. The energy source 118 may be an optical energy source (e.g., a laser), an electron beam source, or a heat source (e.g., heating compressed air) that delivers energy to the build tool via an optical, fluidic, or any other suitable connection. In some implementations, the energy source 118 may be at least in part integrated with the build tool 110.

Power supplies (not illustrated) may be in electrical connection with and supply electrical power to the consolidation energy source 118 and/or the motors 114a-c.

The AM system 100 may be equipped with suitable processing hardware such as a controller 120 that can include one or more processors, memory, communication interfaces, auxiliary circuitry, and/or peripheral electronic devices, configured to control the operation of the AM system 100. In some implementations, the controller 120 is implemented in a mobile computer, a desktop computer, a distributed computing system (e.g., the cloud) or any other suitable system with processing capability.

The controller 120 may be in communicative connection with the motors 114a-c (and/or other suitable actuators) and with the build tool 110 and/or at least some of the components of the build tool 110. The controller 120 may send digital and/or analog signals to the motors 114a-c, causing the motors to actuate the positioning system 112 and or the build platform 116. The controller 120 may use sensor feedback to implement closed-loop control of the motors 114a-c. The controller 120 may use analog control, digital control, or a combination of the two. The signals from the controller 120 may include analog voltage waveforms, pulse-width modulation (PWM) waveforms, and/or digital data in packets or frames in accordance with any suitable modulation scheme and/or communication protocol. In operation, the controller 120 can obtain, compute, and apply control signals to the various components of the AM system 100.

Figure 2:
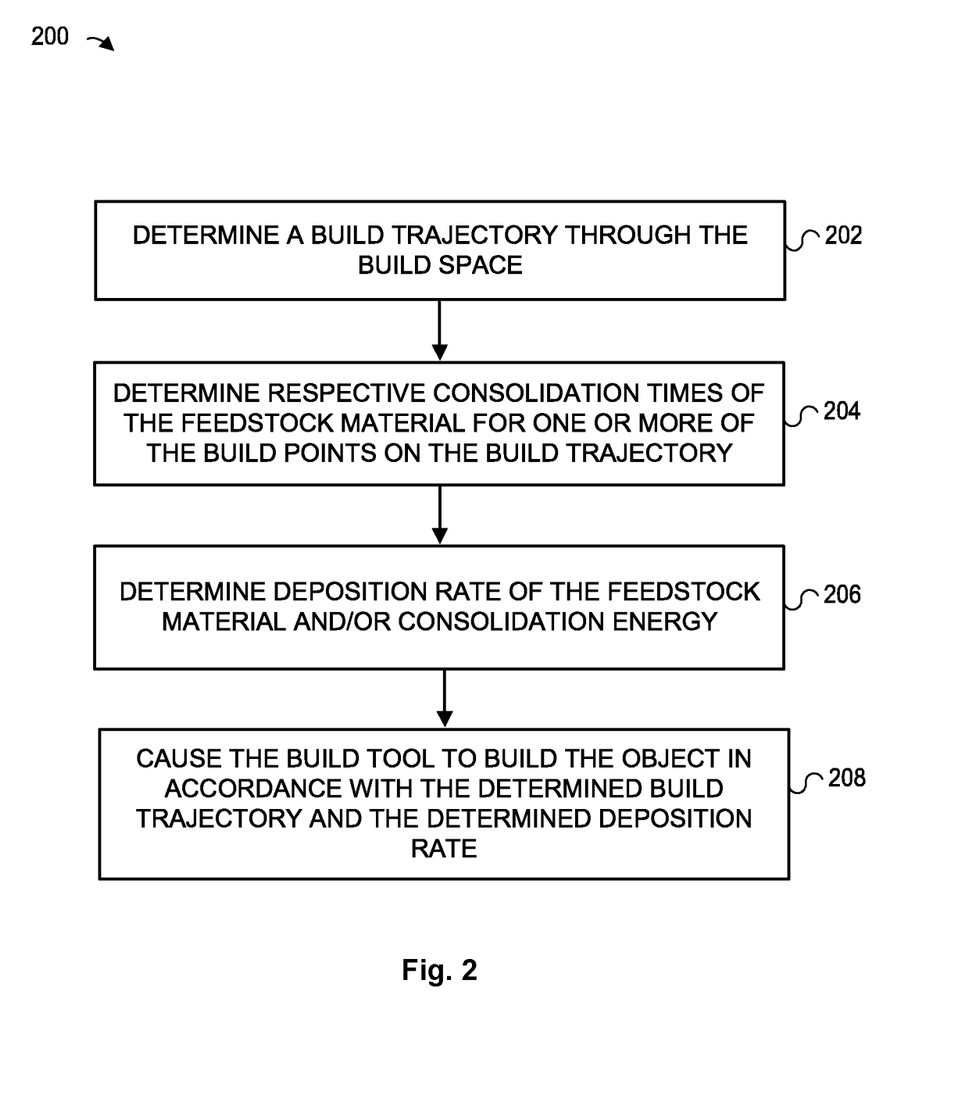
FIG. 2 is a flow diagram of an example method for operating the additive manufacturing system of FIG. 1.

FIG. 2 is a flow diagram of an example method 200 of operating an AM system in which a build tool (e.g., the build tool 110) is configured to deposit a feedstock material and/or deliver consolidation energy promoting consolidation of the feedstock material within a build space to build an object (e.g., the object 105). For clarity, the method 200 is discussed below with example reference to the controller 120 which controls the AM system 100 of FIG. 1. However, the method 200 in general can be implemented in any suitable AM system.

At block 202, the controller 120 determines a build trajectory through the build space. As indicated above, the build trajectory can include a sequence of build points at which the build tool 110 applies feedstock material and/or consolidation energy. The controller 120 can determine the build trajectory based on reading data stored on computer-readable media (CRM) or based on data received via communication interfaces. The controller 120 can select one or more portions of build trajectories from predetermined (e.g., pre-programmed, pre-computed) paths and/or path geometries. Additionally or alternatively, the controller 120 can compute one or more portions in view of a manufacturing or building objective.

In general, build points and build trajectories can refer to a continuum of build points and continuous build trajectories through the build space. In this context, a set of build points may contain an infinity of build points bounded by the dimensions of the printed object. It may be convenient to discretize the continuum to a discrete set of build points. The controller 120 may cause the build tool 110 to move (i.e., depositing feedstock material and/or delivering consolidation energy) continuously through or with respect to at least a section of the build path, whether the build path is discretized or continuous. Likewise, a deposition or delivery process may be continuous, and may be described for any given time by a deposition rate, such as a feedstock material deposition rate and/or an energy deposition rate. A unit of deposited feedstock material may refer to an amount (e.g., volume or mass) of feedstock material deposited during a unit of time. Analogously, a unit of delivered consolidation energy may refer to an amount of energy delivered during a unit of time. The unit of deposited feedstock material may refer to a product of the material deposition rate (e.g., mass flow rate or volume flow rate) and the corresponding unit of time. Analogously, the unit of delivered energy may refer to a product of the energy delivery rate (e.g., optical power, electric arc power, particle energy times flux, mass flow rate times temperature differential of the heated fluid, etc.) and the corresponding unit of time. A suitable unit of time may be anywhere from fraction of a microsecond to many seconds, depending on the type and configuration of the AM system 100.

FIGS. 3A-3D illustrate four examples of 2D build trajectory portions 300a-d, each with 64 build points, of a layer-by-layer 3D build trajectory which the controller 120 can determine at block 202. The trajectory portions 300a-d may be adapted and/or repeated from one layer to the next to build a 3D printed objects, such as, for example, the object 105. The trajectory portions 300a-d are rectangular only for the purpose of illustration and generally can have any two-dimensional shape, and can include concave and convex areas to be consolidated with any number of enclosed empty areas. The number of build points for a trajectory portion may be from less than ten to millions of build points, but FIGS. 3A-3D illustrate 64 build points in each of the trajectory portions 300a-d for the purpose of illustration and comparison. Each of the trajectory portions includes four labeled build points 301a-d, 302a-d, 303a-d, 304a-d, correspondingly analogous to each other from one trajectory portion to another. In trajectory portion 300b, two additional points, 305b and 306b are illustrated. In the discussion below, the trajectory portions 300a-d may be referred to, for simplicity, as trajectories 300a-d (but a complete build trajectory can include multiple layers).

Although FIGS. 3A-3D illustrate the trajectories as build points interconnected with straight lines, in general the controller 120 need not direct the beam of energy or the feedstock material along straight lines. Thus, the actual build trajectory can include arcuate portions or other shapes between build points, in addition to or instead of the straight lines depicted in FIGS. 3A-3D. The build tool 110 in some of these implementations moves into position (to the next build point) along any suitable trajectory which may depend on the mechanical limitations of the system 100. Furthermore, the build tool may deposit material or deliver energy along some segments of the trajectories 300a-d (e.g., the segments depicted by solid lines) or move along a trajectory without depositing material or delivering energy along other segments (e.g., the segments depicted by dashed lines).

The controller 120 can determine multiple candidate trajectories, such as a raster scan trajectory 300a, a reciprocal raster scan trajectory 300b, a spiral trajectory 300c, and/or a combination trajectory 300d. In general, a candidate trajectory can traverse the build points in any suitable order. Thus, a large variety of candidate trajectories are possible. The controller 120 can perform the method 200 for any or all of the candidate trajectories prior to selecting an optimal trajectory for a specified set of constraints.

Returning to FIG. 2, at step 204, the controller 120 can determine respective consolidation times of the feedstock material for one or more of the plurality of the build points. The consolidation time may refer to the time between the deposition of a unit of the feedstock material and the time at which the deposited unit consolidates as a portion of the printed object 105. After a properly chosen time interval corresponding to the consolidation time, the AM system 100 can deposit another unit next to the consolidated unit, besides the unit immediately proximal to the consolidated unit on the portion of the build trajectory. In other words, in some implementations, the AM system 100 deposits a first unit and then deposits a second unit next to the first unit at the next build point on the trajectory even before the first unit fully consolidates. After a certain number of build points, the build trajectory can reach a third build point that is next to (proximate to) the first build point. If the time interval between depositing the first point and the third point is no smaller than the consolidation time of the feedstock material at the first point, the third point may be deposited without the risk of causing a defect near the first point. Similar description applies to implementations in which consolidation energy is delivered at build points in addition to or instead of the feedstock material. More specifically, the consolidation time may refer to the time between the delivery of a unit of consolidation energy into a unit of the feedstock material and the time at which the unit that absorbs the consolidation energy subsequently consolidates as a portion of the printed object.

Consolidation may refer to a property of a unit of the feedstock material that makes it resilient to a neighboring deposition, as described above. For example, the feedstock material may be a metal powder and the consolidation energy may be a laser. When a portion of the metal powder absorbs the energy from the laser beam, the metal power melts. As the molten metal solidifies, it may fuse to the previously solidified metal and become a portion of the printed object. In some implementations, the controller 120 is configured to cause the build tool 110 to avoid delivering consolidation energy next to the melted powder until the melted powder solidifies for a predetermined time interval or consolidation time. In other implementations, the controller 120 can be configured to cause the build tool 110 to deliver consolidation energy at the next build point along the build trajectory even when the next build point is adjacent to the immediately preceding build point at which the feedstock material had not yet consolidated. However, the controller can be configured to avoid other adjacent points until the consolidation time interval is fulfilled.

For example, for the trajectories 300*a-d* in FIGS. 3A-3D, there are eight pairs of labeled adjacent points: 301*a* and 302*a*, 303*a* and 304*a*, 301*b* and 302*b*, 303*b* and 304*b*, 301*c* and 302*c*, 303*c* and 304*c*, 301*d* and 302*d*, 303*d* and 304*d*. The controller 120 can compute a consolidation time for each one of the 16 points. The points 301*a*, 301*b*, 301*c*, and 301*d* may have the same consolidation time because they lie on the portions of the corresponding trajectories 300*a-d* that are indistinguishable, assuming that the build point to the left is the start build point of the corresponding trajectory. The points 302*a-d* are the subsequent labeled points on the trajectories 300*a-d*. The points 301*a* and 302*a* are separated by seven intermediate points along the trajectory 300*a*. The points 301*b* and 302*b* are separated by twelve intermediate points along the trajectory 300*b*. The points 301*c*/301*d* and 302*c*/302*d* have 26 intermediate points along the trajectory 300*c*/300*d*. The controller 120 may be configured to wait at least the length of consolidation time of point 301*a/b/c/d* before causing the build tool 110 to deposit material and/or energy, correspondingly, at the point 302*a/b/c/d*. On the other hand, points 305*b* and 306, that lie between the points 301*b* and 302*b* on the trajectory 300*b*, are separated by only two other build points. Thus, the consolidation time at point 305*b* may constrain the time for the build tool 110 to reach the point 306*b*, and, consequently, increase the time that the build tool will take to traverse the points between the points 301*b* and 302*b*. Consequently, the controller may cause the build tool 110 to traverse more points along the trajectory 300*a* than along the trajectory 300*b* during the same time interval.

Figure 3A:
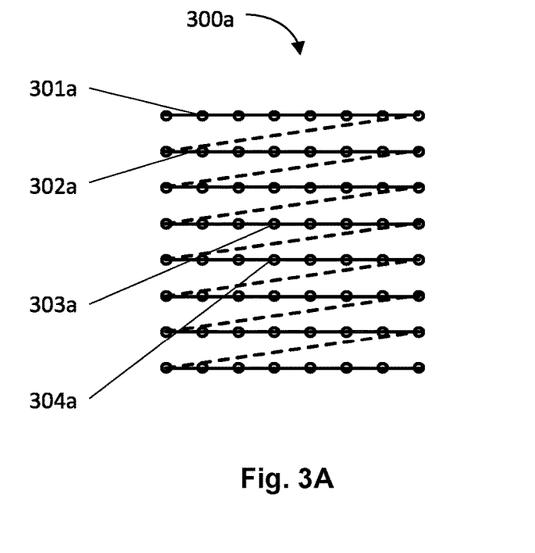
FIGS. 3A-3D schematically illustrate& several example trajectories along which a build tool operating in the AM system can deposit feedstock material or deliver energy.
Figure 3B:
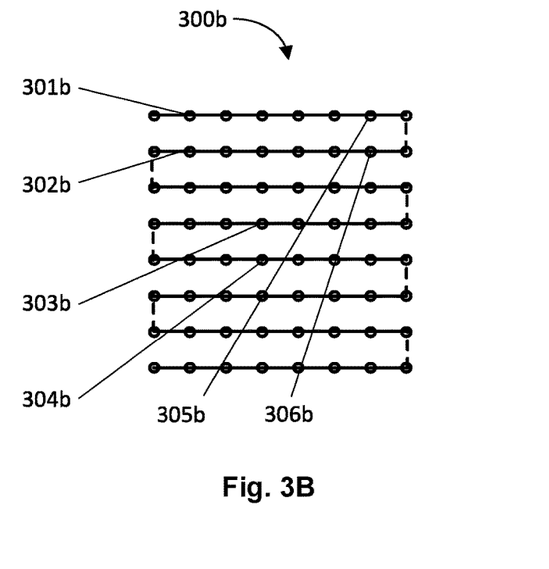
Figure 3C:
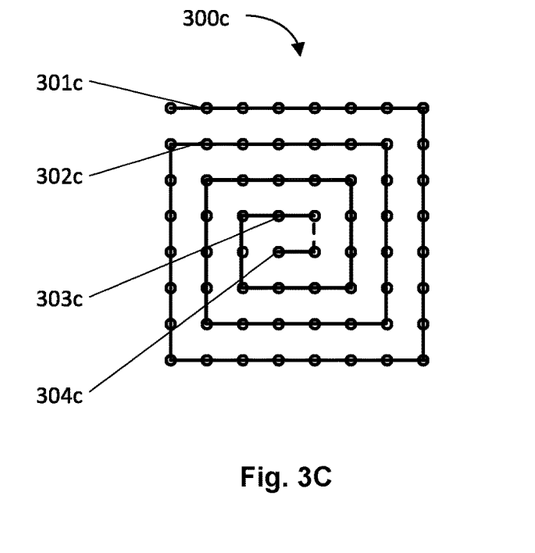
Figure 3D:
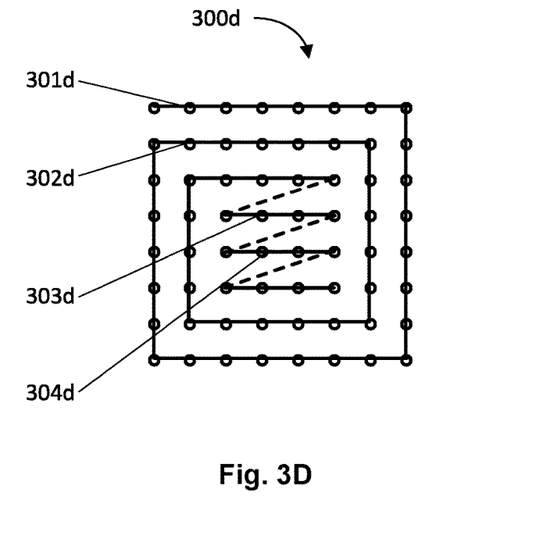

Although the points 301*b* and 302*b* in FIG. 3B are separated by twelve intermediate points, the system 100 in at least some of the implementations re-orients the build tool 110 upon reaching the end of the row or line containing the point 301*b* and beginning to traverse, in the opposite direction, the line containing the point 302*b*. As a result, off-time $T_{off}$ corresponding to the amount of time the system 100 requires to re-orient the build tool 100 to begin travel in a new direction may operate as an additional constraint. As another example, to directly transition from the last build point in a certain line to the first build point in the next line according to the scheme of FIG. 3A (in other words, return to the beginning of the line), the system 100 may require a certain amount of return time $T_R$, which the system 100 also can process as an additional constraint. The return time $T_R$ can approximately correspond to the distance between the last build point in a line and the first build point in the next line divided by the speed at which the build tool 110 moves over the build space (e.g., 10,000 mm/s). In any case, the system 100 can select the most efficient trajectory from among the candidate trajectories 300*a*, 300*b*, etc. in view of the constraints $T_{off}$, $T_R$, etc. The controller 120 may calculate a maximum speed based on the consolidation time at a point and the distance to the adjacent point, as illustrated, along the trajectory. The maximum travel speed (or simply, maximum speed) along the trajectory 300*b* between the points 301*b* and 302*b* in some cases is greater than the travel speed along the trajectory 300*a* between the points 301*a* and 302*a*, assuming, as discussed above, that the consolidation time at the point 301*a* is the same as the consolidation time at the point 301*b*, and subject to the constraints $T_{off}$, $T_R$, etc. discussed above. The maximum speed between 301*c/d* and/or 302*c/d* would be even greater than the maximum speed between corresponding point of the trajectory 300*b*, because of the larger number of intermediate points.

Considering point pairs 303*a-d* and, correspondingly, 304*a-d*, closer to the center of each of the trajectories 300*a-d*, the points 303*c* and 304*c* are substantially closer to each other along the trajectory than their counterparts 303*a* and 304*c*. Only two intermediate points separate 303*c* and 304*c*. Thus, the maximum travel speed between the point 303*c* and the point 304*c* along the trajectory 300*c* is likely lower than the maximum speeds between corresponding two points along, for example, trajectories 300*a-b*. The combination trajectory 300*d* may provide the speed advantage of the spiral trajectory for the outer points, and the speed advantage of the raster-type trajectories closer to the center. The controller 120 is configured to select the trajectory that minimizes build time without violating the predetermined consolidation time, in at least some of the implementations.

As discussed above, the controller 120 may be configured to determine, for at least a portion of the build trajectory, a maximum travel speed (maximum travel speed, consolidation speed, or deposition speed) of deposition along the build trajectory at least in part based on the consolidation time of the feedstock material at a given build point. The controller 120 may further determine the deposition rate of the feedstock material and/or consolidation energy to the feedstock material at least in part based on the predetermined maximum speed. As used in this disclosure, the speed of deposition and the deposition rate refer to different concepts. The speed of deposition refers to the speed at which the AM process moves along the build trajectory. In other words, the speed of deposition may refer to a linear speed, measured for example in millimeters per second (mm/s), descriptive of how fast the build tool 110 moves from depositing feedstock material and/or delivering consolidation energy at one build point to depositing at another build point. Mathematically, the deposition speed may refer to a linear distance between two build points along the build trajectory, divided by the absolute value of the time difference between deposition at the first of the two build points and deposition at the second of the two build points, as shown in Equation 1.

$$v_{P_1}^{P_2} = \left| \frac{\oint_{P_1}^{P_2} dr}{t_{P_2} - t_{P_1}} \right|,$$

Equation 1

In Equation 1, $\oint_{P_1}^{P_2} dr$ is the contour or path integral along the build trajectory from point $P_1$ to point $P_2$, $t_{P_1}$ is the time of deposition at point $P_1$, and $t_{P_2}$ is the time of deposition at point $P_2$. The deposition speed calculated by Equation 1 may be referred to as an average deposition speed between two build points, $P_2$ and $P_1$. The traversal of the build trajectory as a function of time may be described parametrically as:

$$\vec{r}(t) = x(t)\hat{x} + y(t)\hat{y} + z(t)\hat{z}, \quad \text{Equation 2,}$$

where $\vec{r}(t)$ is a vector position on the build trajectory at time t, x(t), y(t), z(t) are, respectively, x-, y-, and z-coordinates, each as a function of time, while $\hat{x}$, $\hat{y}$, $\hat{z}$ are unit vectors in, respectively, x-, y-, and z-directions. Instantaneous travel velocity of a deposition target of the build tool 110 as a function of time may be expressed as $$\vec{v}(t) = \frac{d\vec{r}(t)}{dt} = \dot{x}(t)\hat{x} + \dot{y}(t)\hat{y} + \dot{z}(t)\hat{z}, \quad \text{Equation 3}$$

where $\dot{x}(t)$, $\dot{y}(t)$, $\dot{z}(t)$ are time derivatives of, respectively, x-, y-, and z-coordinates. The instantaneous speed as a function of time may be expressed as $$v(t) = \|\vec{v}(t)\| = \sqrt{\dot{x}^2(t) + \dot{y}^2(t) + \dot{z}^2(t)}, \quad \text{Equation 4,}$$

The controller 120 may be configured to control the position coordinates (i.e., x, y, z) and/or axial speeds (i.e., $\dot{x}$, $\dot{y}$, $\dot{z}$) as a function of time to control deposition speed.

Returning to step 204 in FIG. 2, the controller 120 may determine the consolidation time at a given build point in one or more of a variety of ways. The consolidation times for at least some of the build points may be provided to the controller 120 via computer readable media (CRM), a communication interface, a graphical user interface (GUI), or in any other suitable form. Additionally or alternatively, the controller 120 may determine the consolidation times for at least some of the build points based at least in part on other process parameters and/or the build trajectory. The controller 120 may determine the consolidation times using mathematical formulas and/or by way of look up tables. In some implementations, the controller 120 may determine consolidation times at least in part based on a computational (e.g., physics-based) simulation of the building process using, for example, radiometric, thermodynamic, and/or material physics and chemistry models.

Additionally or alternatively, the controller 120 may determine one or more consolidation times based at least in part on process measurements, conducted during or prior to the process in question. The measurements may, for example, be collected by the sensors built into the build tool 110 and/or disposed anywhere on or around the AM system 100. The measurements may include imaging in the visible spectrum, in infrared (IR, e.g., near IR, mid IR, far IR), terahertz, and/or any other suitable wavelengths, and/or other imaging modalities (e.g., ultrasound). The measurements may include polarimetry and/or interferometry, which may be imaging interferometry. Additionally or alternatively, the measurements may include particle velocimetry, ultrasound measurements, vibration measurements, deformation measurements in response to an applied force, as well as a variety of contact and/or non-contact temperature measurements. The measurements may obtain metrics indicative of temperature, morphology, viscosity, elasticity, and/or any other suitable physical property of material at and/or in the vicinity of a build point of interest. In some implementations, the measurements may include luminescence (e.g., chemo-luminescence), ferromagnetism, and/or any other suitable physical or chemical property of material that may indicate a degree of consolidation.

The controller 120 can combine at least two of a predetermined (a priori) values of consolidation times, computed values indicative of consolidation time, and/or measured values indicative of consolidation times to determine or estimate the consolidation times of interest. The consolidation times may depend on the geometry of the printed object 105 (including, for example, presence of cooling channels), process variables (controlled variables, as well as ambient environmental variables, such as temperature, humidity, air circulation, etc.), and/or properties of the one or more feedstock materials.

At block 206 in FIG. 2, the controller 120 can determine, based at least in part on the determined consolidation time of the feedstock material, the deposition rate of the feedstock material and/or consolidation energy to the feedstock material, and cause the build tool to build an article of manufacture in accordance with the determined build trajectory and the determined deposition rate. The controller 120 can determine the deposition rate so that the time that passes between depositing a certain unit (of the feedstock material and/or of consolidation energy) and depositing another unit in proximity to the certain unit is at least the estimated consolidation time. In some implementations, the controller 120 can add an additional margin to the consolidation time and slow down the deposition rate accordingly.

The controller 120 can dynamically vary the travel speed and/or the deposition rate along the build trajectory. In some implementations, the controller 120 can pause the deposition rate and, possibly, correspondingly pause the movement of the build tool 110 through the build trajectory to reduce an average deposition rate for at least a portion of the build trajectory (e.g., based on the determined consolidation time). Additionally or alternatively, the controller 120 can slow down or speed up an instantaneous deposition rate, and/or gradually change the deposition rate based on the determined consolidation time at one or more build points. The controller 120 can determine dynamic speed and deposition rates for each of the candidate trajectories.

Upon determining the dynamic deposition rates and travel speeds for each of the candidate trajectories, the controller 120 also can determine a build time (or total build time for complete trajectories) for each of the candidate trajectories. In some implementations in which the system 100 includes a single consolidation source, the build time may be estimated using:

$$T_B = \left(\frac{T_\Delta H}{\delta}\right) + \alpha\tau + \left(\frac{M}{vh\delta\rho}\right) \quad \text{Equation 5}$$

where the build time, $T_B$ comprises three additive factors. When the system 100 includes multiple consolidation sources acting upon the same object 105, the equation 5 is modified accordingly. The first factor, indicative of dwell time between layers, $$\frac{T_\Delta H}{\delta},$$

depends on the component height, H, distance between layers, $\delta$, and the dwell time between starting a layer after completing the previous layer, $T_\Delta$. The second factor, indicative of dwell times between continuous consolidation passes (i.e., trajectory portions traversed in continuous motions), depends on the total quantity of consolidation passes, $\alpha$, multiplied by the dwell time between the passes, $\tau$. The third factor accounts for the actual deposition and depends on the mass of the object, M, the density of the object, $\rho$, the X- or Y-distance between build trajectory passes (e.g., measured center-to-center point of adjacent consolidation passes or as the approximate width of a consolidation pass, depending on the implementation), h, the distance between layers (Z), δ, and the travel speed, v. At least some of the above quantities can vary dynamically over a build trajectory, and the controller 120 may perform numerical integration to compute a build time for each candidate trajectory.

Additional details regarding the computations and the method 200 are discussed below, with additional definitions and context regarding the AM process.

The controller 120 can vary the deposition rate based on the determined consolidation rate to comply with a quality requirement while substantially optimizing (i.e., choosing the smallest or nearly smallest among all the suitable possibilities) a total build time for a printed object 105. The controller 120 may be configured to optimize the total build time in a variety of ways. The optimization of the build time can refer to choosing a better option, among a plurality of possibilities, the better option determined in view of an optimality metric, comprising an optimality score and/or an optimality criterion. In some implementations, factors other than the build time may be added to the optimality metric. For example, the quality of the printed part 105, the cost of the process (e.g., measured in terms of energy consumption or time), and/or the wear and/or probability of failure of the AM system 100 may be incorporated into the optimality metric.

On the other hand, the rate of deposition can refer to a mass flow rate, $\dot{m}(t)$, or volume flow rate, $\dot{V}(t)$, of the feedstock material. For filament feedstock, the deposition rate may also refer to a time rate of length of filament deposited by the build tool 110, which may be readily convertible to volume or mass flow rate of the feedstock material. The rate of deposition may also refer to the rate at which consolidation energy is deposited at a given moment in time, corresponding to the power, P(t), as a function of time. The power may refer to the emitted power or to the absorbed power, depending on an implementation. In some implementations, hot gas, plasma, or another suitable energy-carrying material may be used to deposit consolidation energy to the feedstock material. The controller 120 then can use a mass or a volume flow rate of the energy-carrying material, in combination with an estimate of energy in a unit of the energy-carrying material, to estimate the deposition rate as power transferred to the consolidation material.

The controller 120 can determine the consolidation time for any build point. In some implementations, the controller 120 determines a respective consolidation time for most or all of the build points. The controller 120 can subsequently determine the maximum travel velocity between any pair of the build points, based at least in part the determined consolidation times. The controller 120 then can determine an instantaneous travel velocity for traversing any, some, most, or all build point at least in part based at least on the maximum travel velocities between pairs of build points. The controller 120 further can determine a deposition rate for any, some, most, or all build points based at least in part on the determined travel velocities. Because the consolidation times at different build points may depend on the deposition rates at those build points, an iterative computation of consolidation times and deposition rates may help optimize the build time. The controller 120 can use one or more of a variety of optimization algorithms (e.g., one or more of the gradient descent methods and variants) to optimize (e.g., for substantially minimum total build time) the dynamics of deposition rate and/or travel velocity along a build trajectory under consideration.

Generally speaking, possible build trajectories encompass layer-by-layer trajectories, with multiple two-dimensional (2D) raster, reciprocal raster, spiral (e.g., rectangular or circular), and/or combination scans. Each layer of the build trajectory may have adjacent sections with similar or dissimilar 2D scan patterns. Furthermore, the build trajectory may include one or more three-dimensional (3D) trajectory segments, where the deposition may move from one horizontal level to another before depositing material at all of the build points in the former. That is, the deposition sequence may move back and forth across different horizontal levels, subject to a set of manufacturability constraints.

Returning to FIG. 2, at block 208, the controller 120 may can cause the AM system 100 in general, and the build tool 110 in particular, to build the object in accordance with the determined build trajectory and the determined deposition rate, according to the details in the foregoing discussion.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An additive manufacturing system, comprising:
   a build tool configured to deposit a feedstock material and/or deliver consolidation energy promoting consolidation of the feedstock material, within an accessible range defining a build space; and
   a controller configured to:
   determine a build trajectory through the build space, the build trajectory having (i) a plurality of layers, (ii) a combination of a raster and a spiral form within at least one of the plurality of layers, and (iii) a plurality of build points at which the feedstock material is deposited and/or the consolidation energy is delivered,
   determine respective consolidation times of the feedstock material for one or more of the plurality of the build points,
   determine, based at least in part on the determined consolidation times of the feedstock material, a deposition rate at which the feedstock material is deposited and/or consolidation energy is delivered to the feedstock material, and cause the build tool to build an object in accordance with the determined build trajectory and the determined deposition rate.

2. The additive manufacturing system of claim 1, wherein the controller is further configured to:

determine, for at least a portion of the build trajectory, a maximum speed at which the build tool moves a stream of the feedstock material or a beam of energy along the build trajectory, based at least in part on the consolidation times of the feedstock material, and determine the deposition rate of the feedstock material based further on the determined maximum speed.

3. The additive manufacturing system of claim 2, wherein the build tool includes a nozzle for outputting the stream of the feedstock material.

4. The additive manufacturing system of claim 2, wherein the build tool includes an energy guiding element for directing a beam of energy.

5. The additive manufacturing system of claim 4, wherein the beam is one of (i) a laser beam which delivers power to a focal region of the laser beam, or (ii) an electron beam.

6. The additive manufacturing system of claim 1, wherein the controller is configured to minimize a build time required for a stream of the feedstock material or a beam of energy to traverse the build trajectory, subject to a constraint related to the consolidation times.

7. The additive manufacturing system of claim 6, wherein to minimize the build time, the controller is configured to:

determine, for a pair of points separated by at least one intermediate point on the build trajectory, a time interval between respective times when the build tool deposits the feedstock material and/or the delivers consolidation energy at the pair of points.

8. The additive manufacturing system of claim 1, wherein the controller is configured to dynamically vary at least one (i) the deposition rate at which the feedstock material is deposited and/or consolidation energy is delivered along the build trajectory, (ii) a speed at which the build tool moves a stream of the feedstock material or a beam of energy along the build trajectory.

9. The additive manufacturing system of claim 1, wherein to determine the trajectory of the build tool, the controller is configured to:

determine a metric indicative of expected quality of the object, and compute the trajectory to substantially minimize build time while maintaining the metric indicative of the expected quality of the item of manufacture above a threshold value.

10. A method of operating an additive manufacturing system in which a build tool is configured to deposit a feedstock material and/or deliver consolidation energy promoting consolidation of the feedstock material within a build space to build an object, the method comprising:

determining, by processing hardware, a build trajectory through the build space, the build trajectory having (i) a plurality of layers, (ii) a combination of a raster and a spiral form within at least one of the plurality of layers, and (iii) a plurality of build points at which the feedstock material and/or the consolidation energy is applied;

determining, by the processing hardware, respective consolidation times of the feedstock material for one or more of the plurality of the build points;

determining, by the processing hardware and based at least in part on the determined consolidation time of the feedstock material, a deposition rate at which the feedstock material is deposited and/or consolidation energy is delivered to the feedstock material, and causing, by the processing hardware, the build tool to build the object in accordance with the determined build trajectory and the determined deposition rate.

11. The method of claim 10, further comprising:

determining, for at least a portion of the build trajectory, a maximum speed at which the build tool moves a stream of the feedstock material or a beam of energy along the build trajectory, based at least in part on the consolidation times of the feedstock material, and determining the deposition rate of the feedstock material based further on the determined maximum speed.

12. The method of claim 10, further comprising:

minimizing, by the processing hardware, a build time required for a stream of the feedstock material or a beam of energy to traverse the build trajectory, subject to a constraint related to the consolidation times.

13. The method of claim 12, wherein minimizing the build time includes:

determining, for a pair of points separated by at least one intermediate point on the build trajectory, a time interval between respective times when the build tool deposits the feedstock material and/or delivers the consolidation energy at the pair of points.

14. The method of claim 10, further comprising:

dynamically varying at least one (i) the deposition rate at which the feedstock material is deposited and/or consolidation energy is delivered along the build trajectory, (ii) a speed at which the build tool moves a stream of the feedstock material or a beam of energy along the build trajectory.

15. The method of claim 10, wherein determining the trajectory of the build tool comprises:

determining a metric indicative of expected quality of the object, and computing the trajectory to substantially minimize build time while maintaining the metric indicative of the expected quality of the item of manufacture above a threshold value.

16. A non-transitory computer-readable medium storing thereon instructions that, when executed by processing hardware, cause the processing hardware to:

determine, for a build tool configured to deposit a feedstock material and/or deliver consolidation energy promoting consolidation of the feedstock material, a build trajectory through a build space corresponding to an accessible range of the build tool, the build trajectory having (i) a plurality of layers, (ii) a combination of a raster and a spiral form within at least one of the plurality of layers, and (iii) a plurality of build points at which the feedstock material and/or the consolidation energy is applied;

determine respective consolidation times of the feedstock material for one or more of the plurality of the build points;

determine, based at least in part on the determined consolidation times of the feedstock material, a deposition rate at which the feedstock material is deposited and/or consolidation energy is applied to the feedstock material; and cause the build tool to build an object in accordance with the determined build trajectory and the determined deposition rate.

17. The computer-readable medium of claim 16, wherein the instructions further cause the processing hardware to:
- determine, for at least a portion of the build trajectory, a maximum speed at which the build tool moves a stream of the feedstock material or a beam of energy along the build trajectory, based at least in part on the consolidation times of the feedstock material, and
- determine the deposition rate of the feedstock material based further on the determined maximum speed.

18. The computer-readable medium of claim 16, wherein the instructions further cause the processing hardware to minimize a build time required for a stream of the feedstock material or a beam of energy to traverse the build trajectory, subject to a constraint related to the consolidation times.

19. The computer-readable medium of claim 16, wherein to minimize the build time, the instructions further cause the processing hardware to:
- determine, for a pair of points separated by at least one intermediate point on the build trajectory, a time interval between respective times when the build tool deposits the feedstock material and/or the consolidation energy at the pair of points.

20. The additive manufacturing system of claim 1, wherein the combination of the raster and the spiral form includes a raster portion in a center region and a spiral portion outside of the center region.

* * * * *

UNITED STATES PATENT AND TRADEMARK OFFICE
CERTIFICATE OF CORRECTION

| | |
|---|---|
| PATENT NO. | : 11,697,248 B2 |
| APPLICATION NO. | : 16/587603 |
| DATED | : July 11, 2023 |
| INVENTOR(S) | : Ryan E. Spotts |

It is certified that error appears in the above-identified patent and that said Letters Patent is hereby corrected as shown below:

On the Title Page

At item (57), Line 15, "(204)," should be -- (206), --.

In the Specification

At Column 2, Line 28, "one or" should be -- one or more --.

At Column 2, Line 39, "can be one" should be -- can be --.

At Column 3, Line 17, "one or" should be -- one or more --.

At Column 4, Line 3, "illustrate&" should be -- illustrate --.

At Column 5, Line 17, "components the" should be -- components that --.

At Column 6, Line 59, "and or" should be -- and/or --.

At Column 9, Line 2, "metal power" should be -- metal powder --.

At Column 11, Line 5, " $\vec{x}, \vec{y}, \vec{z}$ " should be -- $\hat{x}, \hat{y}, \hat{z}$ --.

At Column 11, Lines 11-12, " $\vec{v}(t) = \dfrac{d\vec{r}(t)}{dt} = \dot{x}(t)\hat{x} + \dot{y}(t)\hat{y} + \dot{z}(t)\hat{z},,$  Equation 3 " should be -- $\vec{v}(t) = \dfrac{d\vec{r}(t)}{dt} = \dot{x}(t)\hat{x} + \dot{y}(t)\hat{y} + \dot{z}(t)\hat{z},$  Equation 3, --.

Signed and Sealed this
Thirtieth Day of April, 2024

Katherine Kelly Vidal
*Director of the United States Patent and Trademark Office*

CERTIFICATE OF CORRECTION (continued)
U.S. Pat. No. 11,697,248 B2

At Column 13, Line 4, "v." should be -- *v.* --.

At Column 13, Line 53, "part the" should be -- part on the --.

At Column 14, Line 16, "can cause" should be -- cause --.

In the Claims

At Column 16, Line 5, "material," should be -- material; --.